Aug. 11, 1959  EIJI MUNEKATA  2,899,293
METHOD OF PRODUCING A NITROGEN PHOSPHATE OR
POTASSIUM NITROGEN PHOSPHATE FERTILIZER
Filed April 25, 1955
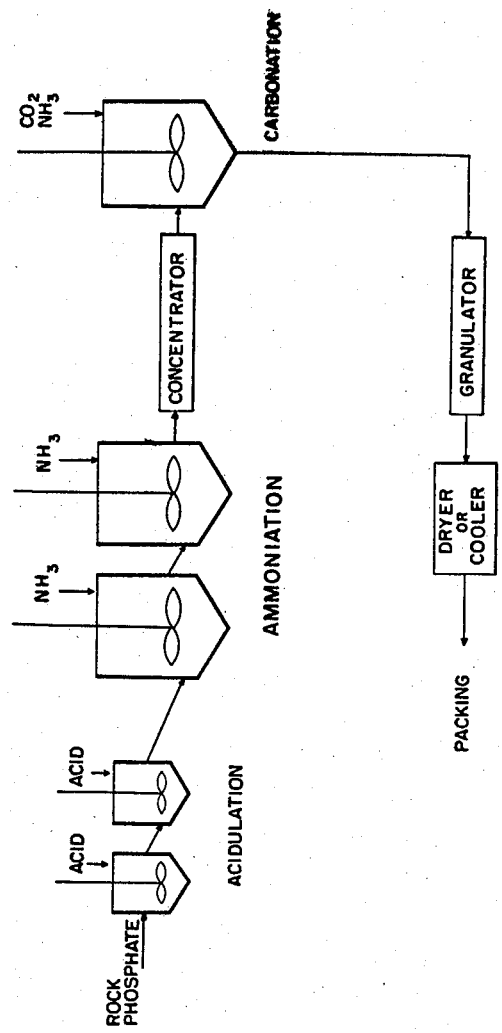
INVENTOR.
EIJI MUNEKATA
BY
ATTORNEYS

United States Patent Office 2,899,293
Patented Aug. 11, 1959

2,899,293

METHOD OF PRODUCING A NITROGEN PHOSPHATE OR POTASSIUM NITROGEN PHOSPHATE FERTILIZER

Eiji Munekata, Tsunetomi, Nobeoka-shi, Japan, assignor to The Asahi Chemical Industry Co., Ltd., Osaka, Japan Application April 25, 1955, Serial No. 503,567

Claims priority, application Japan January 29, 1955

4 Claims. (Cl. 71—43)

The present invention relates to producing a nitrogen phosphate or potassium nitrogen phosphate fertilizer from rock phosphate.

The method, which has been heretofore employed in this field of industry (cf. an article entitled "Nitrogen and Phosphoric Acid Fertilizer," in the Process Progress, The N.F.A., vol. 1, No. 2, March 1952), comprises firstly, preparing a suspension consisting mainly of calcium phosphate and ammonium nitrate and containing 20 to 40% water by adding ammonia to a mixture of phosphoric acid, calcium nitrate and other ingredients as obtained by treating rock phosphate with nitric acid or mixed acid of nitric acid and sulphuric acid; secondly changing the easily soluble calcium salt existing in a form of $Ca(NO_3)_2$ in said suspension to a difficultly soluble calcium salt existing in a form of $CaCO_3$ or $Ca(HCO_3)_2$ with addition of ammonium carbonate, ammonium bicarbonate or the like, then concentrating or drying said suspension, and finally granulating the concentrated or dried product. The thus obtained product was packed and sold in the market.

However, in the aforesaid method of concentrating or drying, a part of calcium salt which has been once made difficultly soluble reacts at a high temperature with, for example, ammonium nitrate concurrently existing in said suspension and changes again into easily soluble calcium salt. Many studies have been made to get rid of this defect, but no effective or definite method has emerged as yet.

To facilitate understanding of the invention, there follows an example of the conventional mode of procedure:

The composition of a suspension obtained by adding ammonia to rock phosphate treated with nitric acid is as follows:

| | Percent |
|---|---|
| $CaHPO_4$ | 16 |
| $NH_4NO_3$ | 38 |
| $Ca(NO_3)_2$ | 15 |
| Others | 3 |
| Water | 28 |

This suspension has fluidity at the normal temperature. The calcium salt in the aforesaid composition, being easily soluble, is subjected to carbonation to be made into difficultly soluble $CaCO_3$. Illustrations of formulae of this process are as follows:

$$Ca(NO_3)_2 + 2NH_4HCO_3 \rightarrow Ca(HCO_3)_2 + 2NH_4NO_3$$
$$Ca(NO_3)_2 + (NH_4)_2CO_3 \rightarrow CaCO_3 + 2NH_4NO_3$$
$$Ca(NO_3)_2 + K_2CO_3 \rightarrow CaCO_3 + 2KNO_3$$

When the said suspension is subjected to a concentration process, $CaCO_3$ and $Ca(HCO_3)_2$ once formed as mentioned above react with ammonium nitrate existing in the suspension, as follows:

$$CaCO_3 + 2NH_4NO_3 \rightarrow Ca(NO_3)_2 + 2NH_3 + CO_2 + H_2O$$
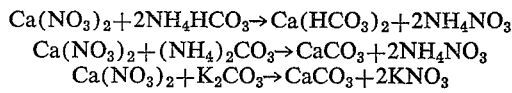

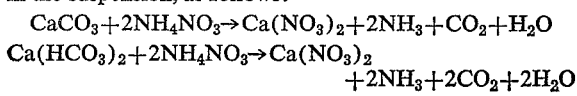

Thus, the calcium salts are transformed again into easily soluble nitrate. Such existence of calcium salts in a form of higher solubility is not desirable, because, when it is sold in the market as a solid fertilizer, the fertilizer has a high hygroscopicity. Therefore, it is desirable that all of the calcium salts exist in a form of difficult solubility.

The present invention is illustrated by means of a diagrammatic flow sheet in the sole figure. According to this invention, which completely removes the aforesaid defect, a concentration operation is carried out subsequent to the ammoniation and prior to the carbonation in the above-mentioned method. That is to say, a concentration operation is applied to a suspension containing 20 to 40% water obtained by acidulation and ammoniation of rock phosphate, to reduce the water content to 5 to 15%. And, carbonation of this concentrated suspension results in a product which easily becomes solid at or below 100° C., and the product is then granulated by utilizing the property of the product that it easily solidifies as the temperature changes, and if necessary the product is dried and then packed. As clear from the above explanation, easily soluble calcium salt in the concentrated suspension is converted into difficultly soluble salts, and the product simultaneously obtained by said carbonation is in a solid form at and below 100° C., and therefore there is no necessity of further subjecting it to an undesirable conventional concentration process subsequent to said carbonation, and, moreover, there is no danger of calcium salts once made difficultly soluble being converted into easily soluble salts.

Any method may be used for concentration of the suspension containing 20 to 40% water obtained by ammoniation. There is no critical condtion whatsoever with respect to reaction temperature, pressure, etc. In connection with carbonation to be applied later on it is preferred to stop the concentration at about 5 to 15% water. Although the concentration may be carried out to a further degree, the aforesaid degree of concentration is preferable for a convenience of a later carbonation treatment, since chemical reactions are, generally speaking, carried out more effectively when the system is in a suspensoid condition. An example of this concentration is as follows:

| | Percent |
|---|---|
| $CaHPO_4$ | 21 |
| $NH_4NO_3$ | 49 |
| $Ca(NO_3)_2$ | 19 |
| Others | 4 |
| Water | 7 |

Carbonation of the concentrated suspension may be carried out by charging ammonia gas and carbon dioxide gas under pressure into a reaction chamber. According to experiments, it is preferable, in case a reaction is made to take place at, for example, 120° C., to carry out said carbonation by keeping the partial pressure of water vapour in the reaction chamber at approximately 2 atmospheres pressure and the total of ammonia gas and carbon dioxide gas therein at approximately 1 atmosphere pressure, whereby the total pressure becomes 3 atmospheres pressure. Carbonation may be carried out under an increased pressure by blowing ammonia gas and carbon dioxide gas into the reaction chamber as mentioned above, or carbonate or bicarbonate may be added into the reaction chamber. Thus, the easily soluble calcium salts in said suspension are totally converted into difficultly soluble calcium salts. An example of the reaction formula is as follows:

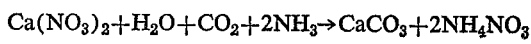

As seen from the above formula, water becomes a part of the reactants in the course of said carbonation and hence water in the carbonized product is reduced in amount. An example of the composition of the thus obtained product is as follows:

| | Percent |
|---|---|
| $CaHPO_4$ | 21 |
| $NH_4NO_3$ | 59 |
| $CaCO_3$ | 12 |
| Others | 4 |
| Water | 4 |

This product is in a sludgy state and has fluidity at 110° C. to 120° C., but tends, by nature, to solidify below 100° C. When the concentrated suspension kept under an increased pressure and over 100° C. is sprayed out of the reaction chamber into a chamber kept under a normal pressure, a granular fertilizer containing dicalcium phosphate, ammonium nitrate and difficultly soluble calcium salt, and, furthermore, potassium salt is obtained. This cooled product may be further subjected to a drying treatment, if necessary. Since a heat treatment subsequent to acidulation, ammoniation and carbonation is applied to a fluid in the case of the aforesaid known method, there takes place a reconversion, such as mentioned above, of calcium salt once made difficultly soluble to easily soluble calcium salt. However, in the case of the present invention wherein the product is in a solid form, there is no fear that such chemical change as in the heating in the aforesaid known method will take place.

As explained in the above, the present invention is not something which has merely altered the order of processes but the one that has a remarkably great advantage of completely preventing, by the said alteration, an undesirable decomposition reaction from difficultly soluble calcium salt to easily soluble calcium salt, such prevention having been absolutely impossible according to any of the conventional methods.

The above figures are only for the purpose of illustration and are not intended to limit the present invention in any way.

What I claim is:

1. A method of producing a nitrogen phosphate fertilizer, which comprises completely dissolving rock phosphate in nitric acid, ammoniating the solution to produce an aqueous suspension consisting essentially of dicalcium phosphate, ammonium nitrate, calcium nitrate and from 20–40% water, concentrating the suspension to a slurry containing from 5–15% water and charging carbon dioxide and ammonia gas under pressure into the concentrated slurry.

2. A method of producing a nitrogen phosphate fertilizer, which comprises completely dissolving rock phosphate in nitric acid, ammoniating the solution to produce an aqueous suspension consisting essentially of dicalcium phospate, ammonium nitrate, calcium nitrate and from 20–40% water, concentrating the suspension to a slurry containing from 5–15% water, charging carbon dioxide and ammonia gas under pressure into the concentrated slurry, and granulating the thus-obtained product.

3. A method of producing a nitrogen phosphate fertilizer, which comprises completely dissolving rock phosphate in nitric acid, ammoniating the solution to produce an aqueous suspension consisting essentially of dicalcium phosphate, ammonium nitrate, calcium nitrate and from 20–40% water, concentrating the suspension to a slurry containing from 5–15% water and charging the concentrated suspension with carbon dioxide and ammonia by introducing ammonium carbonate thereinto.

4. A method of producing a nitrogen phosphate fertilizer, which comprises completely dissolving rock phosphate in nitric acid, ammoniating the solution to produce an aqueous suspension consisting essentially of dicalcium phosphate, ammonium nitrate, calcium nitrate and from 20–40% water, concentrating the suspension to a slurry containing from 5–15% water and charging the concentrated suspension with carbon dioxide and ammonia by introducing ammonium bicarbonate thereinto.

References Cited in the file of this patent

UNITED STATES PATENTS

| 1,854,291 | Burdick | Apr. 19, 1932 |
| 2,738,265 | Nielsson | Mar. 13, 1956 |